Patented Aug. 27, 1935

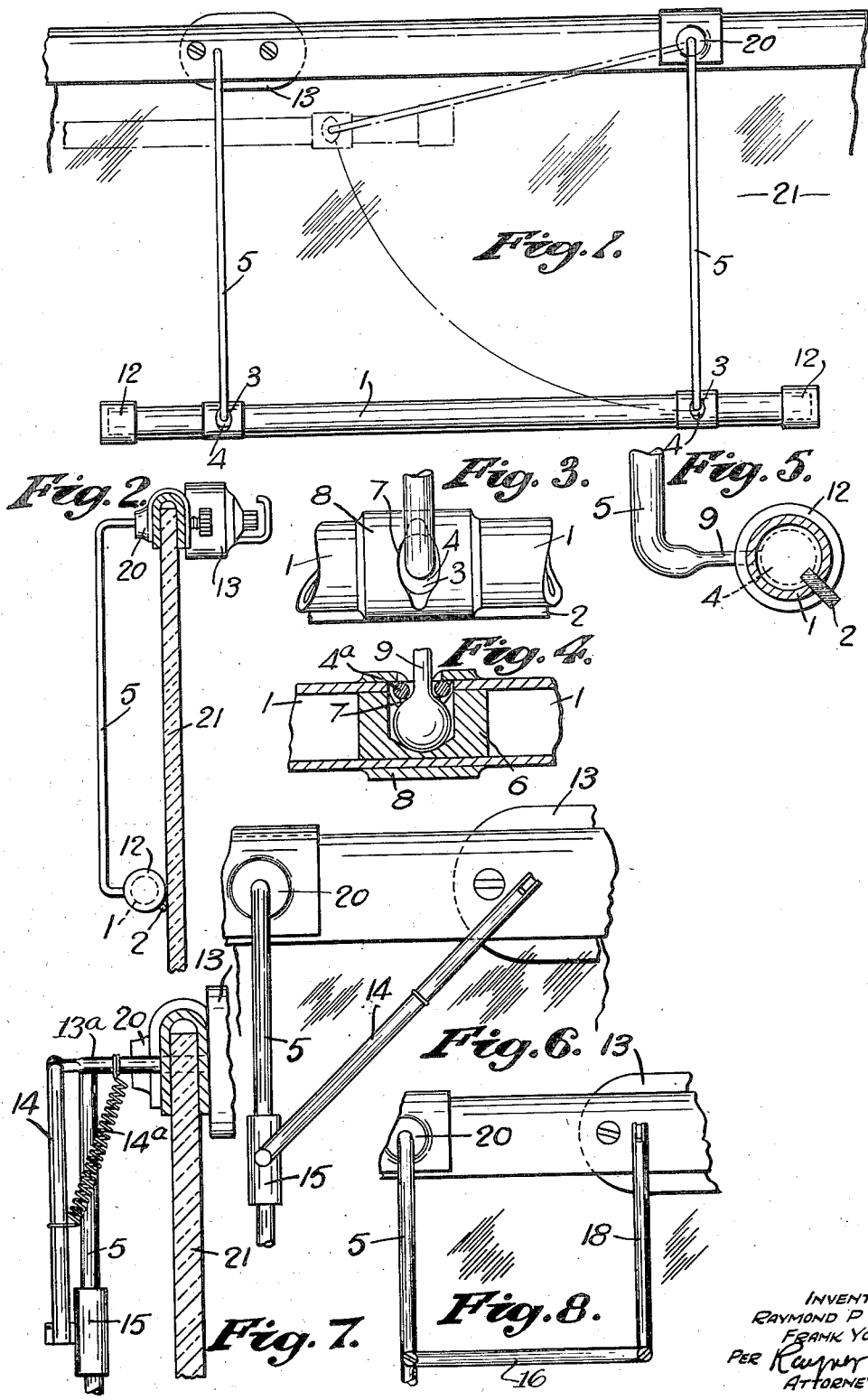

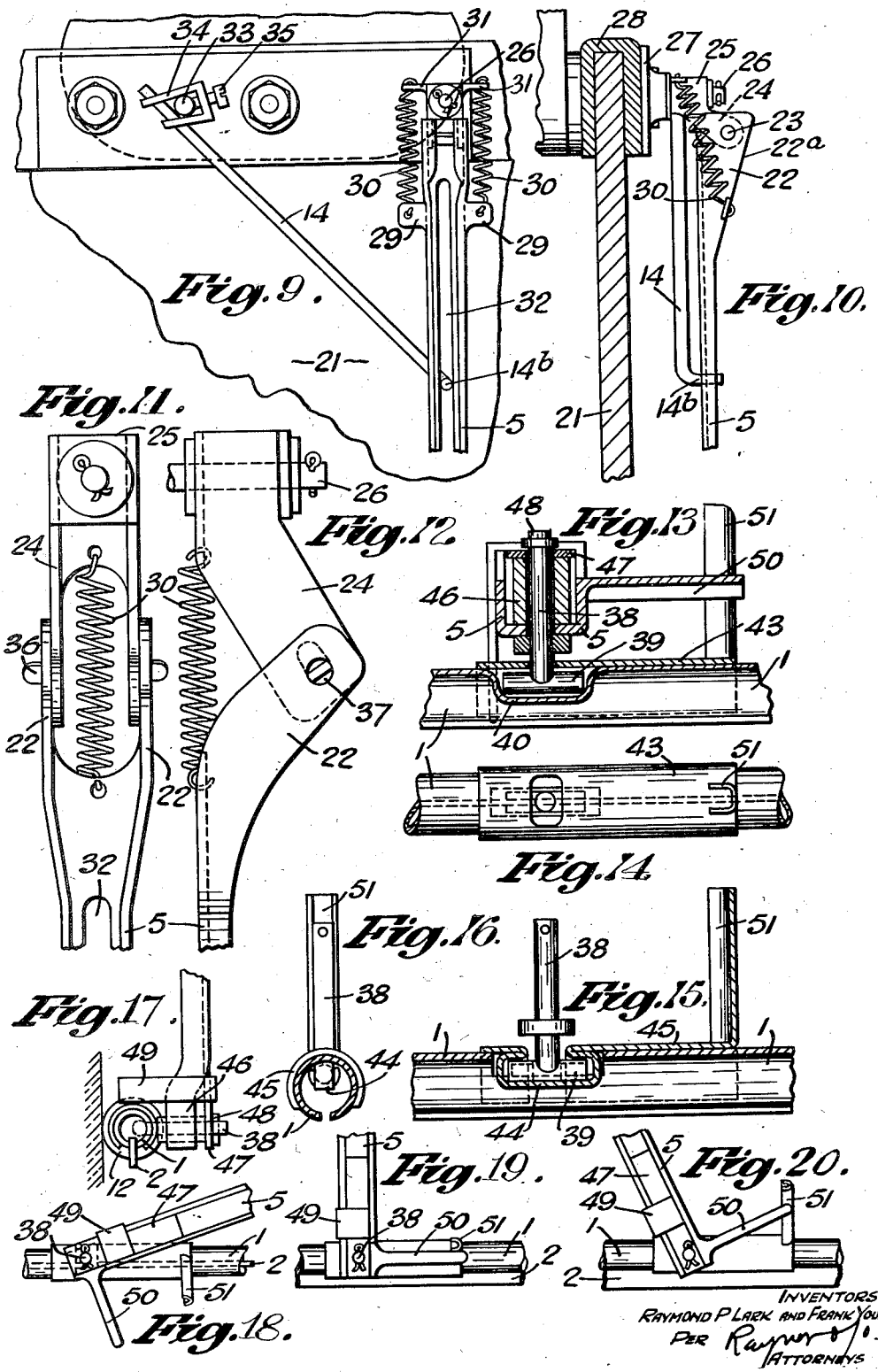

2,012,313

UNITED STATES PATENT OFFICE 2,012,313

WINDSCREEN WIPER FOR ROAD VEHICLES

Raymond Percival Lark, Wallington, and Frank Young, London, England

Application October 25, 1933, Serial No. 695,078
In Great Britain October 29, 1932

6 Claims. (Cl. 15—255)

The present invention relates to windscreen wipers for road vehicles and the like. The object of the present invention is to enable a windscreen to be wiped over a large area in a simple and efficient manner. For example substantially the whole area of a screen through which a driver and adjacent passenger normally have their line of vision can be wiped by means of a single wiper.

Broadly a screen wiper according to our invention is characterized by the wiper being connected to means which moves it in a substantially parallel link manner.

The preferred form of our invention briefly comprises a wiper strip holder supported at two separated points by means adapted to reciprocate both said points simultaneously through arcuate paths, means being provided with the holder whereby during each complete arcuate movement its wiper is pressed operatively against the screen or the like for substantially half the travel of the wiper and during the other part of such movement the wiper is automatically adjusted to an inoperative or non-wiping position on or in its holder.

In carrying one embodiment of our invention into practice a windscreen wiper for road vehicles and the like comprises a substantially horizontal wiper blade mounted upon a pair of arms one or both of which may positively be driven by any of the well known suction or electrically operated motive units. The said arms may be pivotally mounted at one end on the windscreen frame or in brackets secured thereto and at the other may be pivoted or ball jointed to the wiper blade thus providing a more or less universal joint connection of the parts.

The wiper blade is provided with a plurality of frictional devices adapted to engage upon the surface of the windscreen in such manner that upon the upward movements of the blade the rubber wiping edge may be raised from the surface of the glass to a non-wiping position and upon the downward movements the wiping edge is brought into contact with the glass to effect a wiping action.

In order that our invention may be clearly understood and readily carried into effect we have appended hereto two sheets of drawings illustrating embodiments thereof, and wherein:—

Fig. 1 is a front elevation view of one embodiment showing the normal stationary position of the wiper as applied to the windscreen of an open tourer type of motor road vehicle.

Fig. 2 is an end elevation view of the wiper shown in Fig. 1.

Fig. 3 is a detail front elevation view to a larger scale showing how the wiper holder of Fig. 1 is connected to the swinging arm.

Fig. 4 is a sectional plan view of Fig. 3.

Fig. 5 is a sectional end elevation view of the wiper holder showing the angle of the wiper strip when the holder is being carried upwards over the screen.

Figs. 6 and 7 are detail broken front and side elevation views showing an alternative method of connecting the wiper to the operating device thereof.

Fig. 8 is a detail front elevation view showing further modification of the method of connecting the wiper to the operating device.

Fig. 9 is a broken detail front elevation view showing a further method of pivoting and actuating the swinging arms, the upper part of the arm which is connected to the suction or electrically actuated device being shown.

Fig. 10 is an end elevation view of Fig. 9.

Figs. 11 and 12 are front and side elevation views respectively showing the preferred method of pivoting the said arms.

Figs. 13 and 14 are sectional plan and front views respectively showing one method of pivoting the swinging arms to the wiper and a method of reversing the angle of the wiper when it has been moved the desired length in one direction.

Figs. 15 and 16 are detail sectional plan and end elevation views respectively showing a modification of the method of pivoting the swinging arms to the wiper.

Fig. 17 is a detail end elevation view showing the method of limiting the arc of movement of the wiper blade, and Figs. 18, 19 and 20 show the movements of the parts appropriate to the reverse tripping action of the wiper blade.

Referring to the drawings the wiper blade or holder may comprise a length of metallic tubing 1 split longitudinally to receive a strip 2 of rubber or other suitable material to form a resilient wiping edge. At convenient positions on the said tube preferably a short distance from each end are provided a pair of sockets 3, 3 to receive the ball ended laterally directed or cranked extremities 4 of a pair of supporting arms or rods 5, 5 the other ends of which may be secured in suitable apertures in the windscreen frame or in brackets secured thereto. A simple method of producing the sockets 3 for a ball and socket joint in the relatively thin gauge tube 1 is shown in Figs. 3 and 4 and consists in locating a hollowed out block 6 of brass or other suitable material below an aperture 7 drilled in the tube engaging the ball ended rod therein and shrinking an apertured sleeve 8 around that part of each rod lying immediately below the ball. A permanent ball and socket joint is thereby produced which will provide for the arcuate and part rotating movements of the wiper blade. The balls 4 can be formed in the outer ends of pins 9 fixed at their other ends in the lower ends of the arms 5 so as to project laterally therefrom. A circular section ring 4a can be fitted about the part 9 to form outer seatings for the balls 4.

The frictional devices for oscillating the wiper holder on its axis may comprise stout rubber rings or caps 12 engaged over the ends of the wiper blade, their peripheries lying in approximately the same plane as the wiping edge of the rubber strip so that in the "up" direction the rings cause a slight rolling of the blade with a consequent movement of the rubber strip away from the glass. The movement in the opposite direction causes a reverse action thereby bringing the strip into engagement with the glass and effecting a wiping action which sweeps all rainwater toward the bottom of the screen.

Any of the well known suction or electrically operated motive units may be employed to effect the movement of the blade, this unit being indicated by the reference numeral 13, and in one arrangement an actuating arm 14 radiating from the spindle 13a of the motive unit (Figs. 6 and 7) may be pivotally connected at its outer end to a sleeve 15 slidably mounted on one of the wiper blade supporting arms 5 to produce the desired movements of the wiper blade, a coiled tension spring 14a being connected diagonally across the spindle 13a and arm 14 to maintain the wiper pressed against the screen. Alternatively one or both of the wiper supporting arms may be connected directly to the spindles of appropriate suction or electrically operated wiper units as shown in Figs. 1 and 2 or may be connected thereto by a suitable link 16 and radiating arm 18, the arm 18 being connected at one end to the spindle of the unit 13 and the link 16 being connected at one end to the outer end of the arm 18 and at the other end to the appropriate arm 5.

The arms 5 when not connected directly to the motive unit can have their upper ends bent horizontally into bosses 20 formed on U shaped brackets clamped to the windscreen 21. Also the resiliency of the arms 5 may be employed to press the wiper strip against the screen.

In the embodiments shown in Figs. 9 to 20 inclusive the swinging arms 5 are wide U or channel section metal strips, the side limbs of which are widened and extended as bifurcated parts 22 which as shown in Figs. 9 to 20 can be tapered at their front edges 22a, the upper front corners of these parts having a pivot pin 23 passed through them and through lugs 24 formed on a collar 25 rotatable about a pivot pin 26 the axis of which is at right angles to the pin 23 which projects forwardly from a bossed plate 27 affixed to the windscreen frame 28. Lateral lugs 29 stamped out from the metal of the arms 5 receive the lower ends of coiled tension springs 30 the upper ends of which are connected to lugs 31 projecting from the collar 25. By this means the arms 5 can be oscillated about the pins 26 to actuate the wiper and by carrying the axes of the springs 30 beneath the pivot pins 23 the arms are pressed towards the screen 21, but can be swung by hand away from the screen until the springs 30 pass the dead centre positions when the arms 5 will be maintained raised away from the screen 21.

The method of oscillating the arms 5 consists in slotting one of them at its upper ends as at 32 to receive the forwardly cranked lower end 14b of the actuating arm 14 which is adjustably fixed to the spindle 33 of the prime mover 13. The method of adjustably connecting the arm 14 to the spindle 33 is such as to compensate for the various positions of attachment of the appropriate plate 27. The method shown consists of fitting a substantially U-shaped member 34 about the spindle 33 and passing the upper end of the actuating arm 14 through apertures in both limbs of the member 34, a set screw 35 being threaded through the median part of the member 34 and threaded against the spindle 33.

In an alternative method of supporting the channel section arms 5 as shown in Figs. 11 and 12 the upper parts 22 thereof are cranked forwardly as shown in Fig. 12 and lugs 36 are pressed out laterally from the furcations 24 adapted to serve as pivot members engaged in holes 37 in the parts 22. The collars 25 can be rectilinear small box-like sheet metal parts integral with the furcations 24. In this arrangement only one coiled tension spring 30 is provided, connected across the centre of the top of the arm 5 and the lower part of the member 25 as shown.

The lower ends of the arms 5 are connected to the screen wiper holder 1 so as to permit said holder to oscillate about a substantially horizontal axis when the wiper is reversed in its direction of travel. For this purpose a pivot pin 38 is passed horizontally through the lower end of each arm 5 to enable the arms 5 and holder 1 to pivot relatively to each other, each pivot pin 38 being formed with a transverse end part 39 so that it is of T configuration. The transverse parts 39 provide pivotal connections of the arms 5 and wiper holder 1 and for this purpose as shown in Figs. 13 and 14 the transverse parts 39 are engaged ing part cylindrical recesses 40 pressed longitudinally in the tubular member 1, a split sleeve 43 being fitted about each such part of the member 1 to receive the appropriate pin 38 and also to retain the transverse part 39 in position.

In an alternative arrangement shown in Figs. 15 and 16 the transverse parts 39 of the pivot pin 38 are each accommodated in a substantially cylindrical pressed-out part 44 of a metal strip 45 welded or otherwise affixed to the holder 1. In either of these arrangements the pins 38 can be supported in brass or other suitable bushes 46 welded or soldered to the arms 5 (see Fig. 13), a metal strip 47 secured to the arm 5 being pressed against said bush by a split pin 48 passed through the pin 38.

In order to limit the arc of movement of the wiper across the screen each arm 5 carries at its lower end a rearwardly directed lateral abutment 49 adapted to engage the upper side of the holder 1 at the completion of a movement of the wiper in one direction across the screen. These abutments 49 can be formed integral with or affixed to the aforementioned strips 47 (see Fig. 18) and overhang the outer side of each arm 5.

To partially rotate the holder 1 to reverse the angle of the wiper blade as a prelude to the commencement of a wiping action, the arms 5 have affixed to them, or stamped out integral therewith, laterally directed fingers 50 located at the lower ends of the arms and adapted to be brought against fingers 51 projecting laterally from the holder 1, for example as shown in Figs. 13 and 15 by pressing such fingers out from the metal forming the sleeves or bands 45.

The arms 5 need not be parallel as shown as they may be at a small angle relatively to each other, the general effect being a substantially parallel link arrangement.

The holder 1 is shown in Fig. 18 in a position where it has moved down the screen a short distance from the extreme upward position with the wiper blade in contact with the screen; the arms 5 move through an angle of only slightly more than 90° and in Fig. 19 the holder has reached the extreme downward position, in which the finger 51 is in engagement with the finger 50 for the purpose of moving the blade out of contact with the screen. The operation of rotating the holder has been completed in Fig. 20, and the arm 5 is about to swing back through the arc of movement just traversed, so that the holder is moved up the screen with the blade out of contact therewith, until near the extreme upward position the finger 51 comes into engagement with the arm 5 to reverse the angle of the wiper blade.

We claim:—

1. A screen wiper comprising a substantially horizontal wiper holder, a pair of substantially vertical arms, said holder pivotally connecting an adjacent pair of ends of said arms and also being mounted thereon for limited pivotal movement about its longitudinal axis, the other ends of said arms being mounted to oscillate on axes at right angles to the windscreen plane, a motive unit connected to one of said arms, means pressing the wiper strip or blade against the screen during its downward movement and automatically reversing the angle of the wiper when the wiper moves in a reverse direction across the screen, said means reversing the angle of the wiper comprising lateral projections on said holder and lateral projections on said arms positioned to engage those on the holder at the point of reversal of wiper movement.

2. A screen wiper comprising a substantially horizontal wiper holder, a pair of substantially vertical arms, said holder pivotally connecting an adjacent pair of ends of said arms and also being mounted thereon for limited pivotal movement about its longitudinal axis, the other ends of said arms being mounted to oscillate on axes at right angles to the windscreen plane, a motive unit connected to one of said arms, means pressing the wiper strip or blade against the screen during its downward movement and automatically reversing the angle of the wiper when the wiper moves in a reverse direction across the screen, said means reversing the angle of the wiper comprising lateral projections on said holder and lateral projections on said arms positioned to engage those on the holder at the point of reversal of wiper movement, and further projections on said arms positioned to engage said holder to limit movement of the wiper in one direction.

3. In a windscreen wiper a pair of spaced swingably mounted arms, a wiper holder connected across the free ends of said arms the other ends each oscillating on an axis at right angles to the windscreen, a projection at the free end of one of said arms and a forwardly directed projection on said holder, the projection on said arm being positioned to be swung against said projection on the holder to impart a partial substantially axial rotation of the holder.

4. In a windscreen wiper a pair of spaced substantially parallel arms, a wiper holder connected across one end of said arms, pivots at the other ends of said arms by which said arms and holder can swing in a parallel link manner about the fixed axes of said pivots with the holder moving in an arcuate path, and means on said arms and said holder co-operating to positively partially rotate the wiper holder on its axis at the end of each arcuate travel of the holder.

5. A screen wiper comprising a substantially horizontal wiper holder, a pair of substantially vertical arms, means to oscillate said arms upwards and downwards through an angle not greater than approximately 90 degrees, said holder pivotally connecting an adjacent pair of ends of said arms and also mounted thereon for limited pivotal movement about its longitudinal axis, the other ends of said arms being mounted to oscillate on axes at right angles to the plane of the windscreen, a finger projecting laterally from each free end of each arm and positioned to press against a finger projecting forwardly from an adjacent part of the wiper holder so as to reverse the wiper as the wiper completes the downward stroke.

6. In a screen wiper a pair of substantially parallel arms, a wiper holder connected across an adjacent pair of ends of said arms, means pivotally connecting said arms each at one end on an axis at right angles to the windscreen plane, means for oscillating the arms about their pivoted end, pins at the free ends of said arms projecting towards the screen, heads on the free ends of said pins engaged in the wiper holder so that the wiper can oscillate on its axis on said heads, and cooperating means on said arms and said holder effecting a limited axial turning of said holder when said holder is in a position approximately at right angles to said arms.

RAYMOND PERCIVAL LARK.
FRANK YOUNG.